United States Patent [19]

Wiley

[11] Patent Number: 4,806,272
[45] Date of Patent: Feb. 21, 1989

[54] CONDUCTIVE CATHODIC PROTECTION COMPOSITIONS AND METHODS

[75] Inventor: Robert E. Wiley, Port Huron, Mich.

[73] Assignee: Acheson Industries, Inc., Port Huron, Mich.

[21] Appl. No.: 757,084

[22] Filed: Jul. 19, 1985

[51] Int. Cl.$^4$ .............................................. H01B 1/06
[52] U.S. Cl. ................................... 252/511; 252/502; 252/510; 524/495; 524/496
[58] Field of Search ................ 252/502, 503, 511, 510; 524/495, 496; 523/468

[56] References Cited

U.S. PATENT DOCUMENTS

| | | | |
|---|---|---|---|
| 1,504,292 | 8/1924 | Wickes . | |
| 2,328,198 | 8/1943 | Davenport et al. . | |
| 2,730,597 | 1/1956 | Podolsky et al. | 201/63 |
| 3,048,515 | 8/1962 | Dalton | 162/126 |
| 3,096,229 | 7/1963 | Whitman | 162/135 |
| 3,149,023 | 9/1964 | Bodendorf et al. | 162/135 |
| 3,151,050 | 9/1964 | Wilburn | 204/147 |
| 3,265,557 | 8/1966 | Frics et al. . | |
| 3,273,779 | 9/1966 | Mykleby | 229/14 |
| 3,367,851 | 2/1968 | Filreis et al. | 204/2 |
| 3,391,103 | 7/1968 | Mueller | 260/38 |
| 3,404,019 | 10/1968 | Gotshall | 106/307 |
| 3,444,183 | 5/1969 | Hubbuch | 260/32.6 |
| 3,505,263 | 4/1970 | Roth | 260/29.6 |
| 3,615,754 | 12/1968 | Gotshall | 106/30 |
| 3,653,498 | 4/1972 | Kisor | 206/46 |
| 3,746,157 | 7/1973 | I'Anson | 206/46 |
| 3,774,757 | 11/1973 | Harris et al. | 206/62 |
| 3,868,313 | 2/1975 | Gay | 204/196 |
| 3,870,987 | 3/1975 | Wiley | 338/214 |
| 3,954,674 | 5/1976 | Reis | 252/502 |
| 3,962,142 | 6/1976 | Freeman et al. | 252/502 |
| 4,035,265 | 7/1977 | Saunders | 252/510 |
| 4,037,267 | 7/1977 | Kisor | 361/220 |
| 4,038,693 | 7/1977 | Huffine et al. | 360/99 |
| 4,084,210 | 4/1978 | Forrest | 361/212 |
| 4,108,798 | 8/1978 | Sze et al. | 252/502 |
| 4,160,503 | 7/1979 | Ohlbach | 206/328 |
| 4,188,279 | 2/1980 | Van | 252/510 |
| 4,211,324 | 7/1980 | Ohlbach | 206/328 |
| 4,241,829 | 12/1980 | Hardy | 206/328 |
| 4,293,070 | 10/1981 | Ohlbach | 206/328 |
| 4,369,171 | 1/1983 | Grindstaff et al. | 252/502 |
| 4,444,837 | 4/1984 | Blum | 428/332 |
| 4,476,265 | 10/1984 | Blackwell, Jr. | 524/10 |
| 4,482,048 | 11/1984 | Blodgett | 206/328 |
| 4,483,840 | 11/1984 | Delhay et al. | 252/511 |

OTHER PUBLICATIONS

Preliminary Technical Bulletin 4-2-14c, Eccocoat Sec-Electrically Resistive Flexible Coating Emerson and Cuming, 7/24/74.

Technical Bulletin 4-2-14B, Eccocoat 256 and 257, Carbon Based Lacquers, Emerson and Cuming, 2/6/75.
Conductive Paints for EMI Shielding, Grounding and Static Discharge, Tecknit, 1977.
Conductive Coatings Cut Costs, Simplify Electrical Designs, Acheson Colloids Co., Nov., 1971.
Resistance Coatings, Acheson Colloids Co., Dec, 1970.
Aerodag G, Acheson Colloids Co., 1971.
Electrodag 37, Acheson Colloids Co., 1971.
Aquadag E, Acheson Colloids Co., 1971; Ends Static Inteference, Acheson Colloids Co., Dec., 1974.
*Electrodag* +501, Acheson News, Product Application, Acheson Colloids Company, Division of Acheson Industries, Inc. (9/23/75).
*Abstract*, Lakokras Mater., Primenenie, No. 1, 1974, pp. 21-23 (In Russian), Inst. Pap. Chem., vol. 46, No. 6, Dec. 1975, p. 618, Ioshpe, M. L.
*The Strange Case of Element 6*, Lubrication Engineering, 4/1961, Acheson Colloids Company.
*A List of "Dag" Dispersions of Colloidal Graphite and Other Solids*, DAG Dispersions, Acheson Colloids Limited, First Published 5/1955.

*Primary Examiner*—Josephine Barr
*Attorney, Agent, or Firm*—Harness, Dickey & Pierce

[57] ABSTRACT

Disclosed are improved compositions useful in providing a conductive layer or coating on or within a substrate. The compositions contain elemental carbon and a polymeric matrix or binder. The improvement comprises employing a unique ground calcined, coal-based coke which approaches graphite in terms of its performance as a conductive additive or pigment but does not possess the disadvantages associated with the use of graphite.

The unique coke employed in the compositions and methods of the present invention has a significant level of graphitic structure. This level of graphitization can be most easily recognized by utilizing x-ray powder diffraction. More specifically, when the value of $E_c$, or the inverse peak width (of the 002 peak), is measured for this material using Mo K$\alpha$ radiation ($\lambda=0.71$ Å), the value is in the range of about 27 to about 80, and preferably about 28 to about 75.

The final compositions employ a polymer resin or matrix system as a binder which, when allowed to dry or cure, in situ, is water-permeable. They are useful as cathodic protection coatings for concrete and other building materials which are reinforced with low carbon steels and the like.

The invention also relates to the method of applying the compositions to the reinforced substrate, and the resulting coated articles.

16 Claims, No Drawings

CONDUCTIVE CATHODIC PROTECTION COMPOSITIONS AND METHODS

The present invention relates to improved compositions which are useful in providing a conductive coating or layer upon or within a substrate. The compositions, which contain elemental carbon and a polymer binder or matrix, are improved by the addition of a unique high-conductivity/low-resistivity calcined coal-based coke.

More specifically, present invention relates to a composition useful in the protection of concretes or other building materials or components which are reinforced with many ferrous-based low carbon steel structures or elements. The composition is applied to the exterior surfaces of the concrete or building material. The invention also relates to the method of improving corrosion resistance and protecting concrete or other building materials by applying these compositions. The invention further relates to the resultant coated structure or material itself.

The present invention is based upon the well-known principle of cathodic protection.

BACKGROUND OF THE INVENTION

It is well known that when many ferrous-based low carbon steels and other metals are exposed to moisture and air they rust, corrode or otherwise degrade. When these low carbon steels are used to reinforce concrete or other building materials, they frequently become exposed to harsh weather and brine from road salts or the sea which greatly accelerate this corrosion and accordingly greatly reduce the life span of the reinforced elements or roadway. The Department of Transportation of the State of Florida estimates that this damage to bridge decks and associated support structures alone imposes a repair cost of from 160 to 500 million dollars anually in the U.S. alone.

The process underlying this deterioration of the roadway is the deterioration and volume expansion of the reinforcing steel element. This in turn is caused by the conversion of the iron (Fe) within the low carbon steel to iron oxide—rusting.

The underlying corrosion is caused by the formation of electrolytic cells in which different parts of the steel reinforcement can be both the anode and the cathode of an electrolytic cell when in the presence of moisture. Differences in ionic concentrations at different sites determine whether a particular site is cathodic or anodic. Anodic reaction products (i.e. iron oxide) have a greater volume than the original steel, so great internal pressure is applied within the concrete, causing it to crack and spall.

Cathodic protection is one method recognized as being useful in preventing or retarding the process. It involves introducing a separate additional electrode (anode) and applying an impressed current such that all of the steel reinforcement becomes cathodic, thus preventing the formation of iron oxide.

Many cathodic protection systems are known. For example, U.S. Pat. No. 3,868,313, issued to P. J. Gay, Feb. 25, 1975, discloses a cathodic protection system comprising applying an electrically insulating coating on the substrate followed by the application of an electrically conductive coating over the insulating coating. A D.C. voltage is then applied between the metal substrate and the conductive coating.

U.S. Pat. No. 3,151,050, issued Sept. 19, 1964, discloses methods for cathodic protection for vehicles and components in storage. The method comprises the application of an electrically conductive paint to the metal to be protected. The paint is a suspension of carbon, manganese dioxide, ammonium chloride and an organic filler and a solvent such as methyl-ethyl-ketone. A second coating of resin containing metallic copper is then applied, followed by a final coat of paint or enamel. Lastly, a D.C. voltage is applied between the conducting paint and the metal base.

Other polymer compositions containing various carbon based materials are also known. U.S. Pat. No. 4,035,265, issued July 12, 1977, to J. A. Saunders discloses electrically conductive paint compositions employing graphite and colloidal carbon. The graphite is subjected to wet grinding so as to reduce the graphite to thin platelets. The colloidal carbon employed consists of particles having a size from 20 to 50 millimicrons. The final composition (including the article it is applied to) is used as a heat source when electrical current is passed through the coating.

Other efforts at carbon-containing coatings are found in (1) U.S. Pat. No. 3,505,263, which discloses finely divided calcined petroleum coke in a polymer latex binder;

(2) U.S. Pat. No. 3,404,019, which discloses the use of fluid petroleum coke as a filler or pigment in polymeric compositions;

(3) U.S. Pat. No. 2,730,597, which discloses resistance elements which optionally employ various materials in a resin base;

(4) U.S. Pat. No. 4,476,265, which discloses poly (arylene sulfide) compositions which contain a "black carbonaceous pigment";

(5) U.S. Pat. No. 4,444,837, which discloses coating or sealing-type plastisols which contain carbon dust as a filler;

(6) U.S. Pat. No. 3,391,103, which discloses phenolic resin compositions which employ "oxidized carbon particles";

(7) U.S. Pat. No. 3,615,754, which discloses an ink which employs 2 to 10 percent of ground coke; and (8) U.S. Pat. No. 3,444,183, which discloses a film forming composition made from a heat-resistant polymer and a dispersion of carbon particles.

SUMMARY OF THE INVENTION

The present invention relates to improved compositions useful in providing a conductive layer or coating on or within a substrate. The compositions contain elemental carbon and a polymeric matrix or binder. The improvement comprises a unique ground calcined, coal-based coke which approaches graphite in terms of its performance as a conductive additive or pigment but does not possess the disadvantages associated with the use of graphite.

The unique coke employed in the compositions and methods of the present invention has a significant level of graphitic structure. This level of graphitization can be most easily recognized by utilizing x-ray powder diffraction. More specifically, when the value of $E_c$, or the inverse peak width (of the 002 peak), is measured for this material using Mo K$\alpha$ radiation ($\lambda=0.71$Å), the value is in the range of about 27 to about 80, and preferably about 28 to about 75. In a highly preferred embodiment, the cokes employed in the compositions and methods of the present invention contain $SiO_2$, $Fe_2O_3$, $Al_2O_3$, $Ca_2O$, $K_2O$ and $Na_2O$. They have a carbon content of at least about 90 percent, and more preferably about 94.5 percent, by weight of the coke, and an ash content of about 0.1 percent to about 1.5 percent, by weight of the coke. The weight:weight ratio of $SiO_2$:$Fe_2O_3$ in the ash is in the range of about 3:1 to about 7:1, and the weight:weight ratio of $Fe_2O_3$:$Al_2O_3$ in the ash is in the range of about 1:1 to about 6:1.

The final compositions employ a polymer resin or matrix system as a binder which, when allowed to dry or cure in situ, is water-permeable. They are useful as cathodic protection coatings for concrete and other building materials which are reinforced with low carbon steels and the like.

The invention also relates to the method of applying the compositions to the reinforced substrate, and the resulting coated articles.

DETAILED DESCRIPTION OF THE INVENTION

It will be appreciated that a wide variety of carbon-based materials possessing a wide variety of particle shapes and sizes have been employed in polymer-based coatings. These materials have been generally employed as pigments to add conductivity to the final composition. However, it has now been discovered that a certain heretofore unrecognized ground coal-based calcined coke can be employed in combination with a polymer resin to provide an improved resin-coke system for conductive coatings of wide utility. These systems have particular utility as a cathodic protection coating for arresting or preventing corrosion of and preserving concrete roads, structures and the like reinforced with ferrous-based low-carbon steel elements or structures.

It will also be appreciated from the above background section that while many elemental carbons and carbon-based materials have been used as conductive additives or pigments, when good conductivity is necessary graphite has been the additive or pigment of choice.

Graphite, due to its allotropic form and crystalline structure, can be incorporated into a solvent or solvent/resin matrix and provide a final composition which has high conductivity and low resistivity. However, graphite suffers from some disadvantages which make it difficult to employ in coatings; two of these disadvantages appear to be associated with the very crystalline structure which make it so valuable as a conductive material.

Graphite is an allotropic form of elemental carbon consisting of layers of hexagonally arranged carbon atoms in a planar, condensed ring system. The layers are stacked parallel to each other in two possible configurations, hexagonal or rhombohedral. This structure, along with the covalent ($sp^2$ hybridization) bonding within the layers and Van der Waals forces holding the layer-layer arrangement together, make graphite extremely efficient as a conductive material and as a lubricant.

However, when incorporated into a polymer resin system which is applied to a surface and allowed to dry or cure, the incorporated graphite within the system will easily "transfer" to or rub off onto a second surface if the two surfaces are brought into frictional contact.

For example, if graphite is placed in an acrylic latex coating at a level that will provide conductivity, the resulting coating must be protected from contacting any other surface. Frictional contacting, such as simply rubbing your finger across the coated surface, would result in the transfer of a noticeable amount of graphite to your finger, i.e., the graphite will "rub-off" onto your finger.

As a result of this transfer property, the graphite-containing composition cannot be durably overcoated, i.e., it will not accept a decorative or protective overcoat. For the reason discussed above, the second coating will not adhere to the graphite-containing material.

Another disadvantage associated with the use of graphite as an additive in polymer compositions is that graphite interferes with some curing catalysts, e.g., peroxide-types.

A fourth (and frequently prohibitive) disadvantage associated with graphite is that graphite, when compared to other carbon-based conductive additives, is extremely expensive.

As a result of these disadvantages, primarily the "transfer" property, the art has frequently turned to other types of elemental carbons such as carbon black, petroleum-based coke, and the like. It will be appreciated that the carbon blacks which are adequately conductive are extremely expensive; normal petroleum-based cokes are not adequately conductive.

Coke is generally considered to be the highly carbonaceous product resulting from the pyrolysis of organic material at least parts of which have passed through a liquid or liquid-crystalline state during the carbonization process and which consists of non-graphitic carbon. See Carbon, 20:5, pp 445-449 (1982), incorporated here by reference. Some cokes are capable of acting as conductive additives and pigments; some cokes provide no conductivity.

In addition to being less expensive than most highly conductive graphites, conductive cokes possess the added advantage of not exhibiting transfer. However, because conventional cokes do not conduct as efficiently as graphite, the cokes which are conductive must be added at extremely high pigment:binder ratios. Due to its reduced cost when compared to graphite, even at these high levels coke can be economically employed.

Regardless of the level employed, however, conventional conductive cokes simply have not been capable of achieving the level of conductivity that graphite can provide. There are therefore many uses where graphites had to be employed in spite of its transfer, overcoatability and other disadvantages.

It has now been surprisingly discovered that a certain unique coke material is capable of demonstrating a conductivity/resistivity closely approaching that of graphite, but which does not possess the curing, rub off, overcoatabilty and cost disadvantages usually associated with graphites.

This unique coke material provides improved conductivity at reduced cost in a wide range of resin and resin solvent systems. The resulting compositions provide a wide variety of utilities. Further, this unique coke has the added unexpected advantage of being able to accept other non-carbonaceous pigments in the resin system while maintaining significant conductivity. Thus, the final composition can be pigmented other than black.

When employed at the levels and ratios described herein, the final compositions of the present invention possess a conductivity/reduced resistance nearly equivalent to systems employing more expensive graphite, but without many of the disadvantages associated with graphite.

As mentioned above, the term "coke", as generally used in the art, refers broadly to the many high carbonaceous products of the pryolysis of organic material at least parts of which have passed through a liquid or liquid-crystalline state during the carbonization process and which consist of non-graphitic carbon. However, the term "coke" as applied to the compositions and methods of the instant invention refers to a small select subclass of cokes. From a structural viewpoint, the term "coke", as used herein, characterizes the state of a graphitizable carbon before the actual beginning of graphitization, i.e., before the solid state transformation of the thermodynamically unstable non-graphitic carbon into graphite by thermal activation.

The cokes useful in the practice of the present invention are cokes which have high conductivity/low resistivity and include only a select fraction of the materials generally referred to in the art as "coke". They are coal-based, calcined ground materials.

The cokes useful in the practice of the present invention are primarily classified by the possession of a level of graphitic order which is high enough to provide high conductivity/low resistivity when placed into a polymer matrix, but below that which results in a tendency to rub off and/or the inability to accept an overcoat. These cokes may be used in place of graphite in certain compositions and methods; they may also be used in combination with graphite. They are particularly useful in these circumstances (where graphite is to be employed) because they will allow the graphite to be used at a significantly reduced level while allowing overcoatability and enhancing conductivity.

The most effective way of characterizing the cokes of the present invention is by x-ray powder diffraction. The material may be examined employing a conventional powder diffractometer fitted with a pyrolytic graphite monochromatic source. A power source such as a 12 kw rotating anode generator may be employed operating at about 55 kV and 160mA; a molybdenum anode (K$\alpha$radiation), providing an average x-ray wavelength $\lambda$ of about 0.71Å, is also employed. The sample should be placed in a Lindeman glass tube having a diameter of about 0.8 mm. The c-axis carbon-carbon d-spacings and range of ordering along the c-axis are determined from the width of the carbon (002) peak produding an $E_c$ value. In general the larger the $E_c$ value, the better the ordering, i.e., graphites have $E_c$'s in the range of greater than 200. Cokes of the present invention possess an $E_c$ value of about 27 to about 80, more preferably about 28 to about 75, and still more preferably about 2 to about 65.

Useful cokes of this class may contain greater than about 80 elemental carbon by weight. The cokes preferred for use in the present invention possess a carbon content of greater than about 90 percent, more preferably about 94.5 percent, and still more preferably about 95.0 percent, by weight. In a highly preferred embodiment, the cokes of the instant invention have a carbon content of about 95.0 to about 97.75, and even more preferably about 95.30 to about 95.40, by weight.

The preferred cokes for use in the present invention have an ash content of about 0.1 to about 1.5 percent, by weight of the coke. Even more preferably, the ash content is in the range of about 0.80 to about 1.25, and still more preferably about 1.0 to about 1.15, by weight.

In a highly preferred embodiment, the weight:weight ratio of $SiO_2:Fe_2O_3$ in the ash is in the range of about 3:1 to about 7:1, and still more preferably about 4:1 to about 6:1; in a highly preferred embodiment the ration is about 5:1. In these embodiments, the weight:weight ratio of $Fe_2O_3:Al_2O_3$ in the ash is in the range of about 6:1 to about 1:1, and still more preferably about 2:1.

The cokes preferred for use in the present invention contain a level of CaO in the ash of less than about 2.5 percent, more preferably less than about 1.0 percent, and still more preferably less than about 0.5 percent, by weight of the ash. In a highly preferred embodiment, the coke contains a level of CaO of about 0.5 percent, by weight of the ash, or about 0.00005 percent, by weight of the coke.

The cokes preferred for use in the present invention contain a level of $K_2O$ of less than about 0.75 percent, and more preferably about 0.5, and even more preferably about 0.25, percent by weight of the ash. In a highly preferred embodiment, the coke contains a level of $K_2O$ of less than about 0.20 percent by weight of the ash, or about 0.00002 percent by weight of the coke.

The coke may be employed with polymer-based binders or matrices alone, or in combination with other conductive and non-conductive pigments, including other carbon-based materials. However, in a preferred embodiment, the final composition is substantially free of graphite, due to graphite's interference with the stability of overcoatability of the final coating composition.

Other suitable material useful in combination with the cokes described above include other elemental carbon fillers and pigments selected from the group consisting of carbon black, petroleum coke, calcined petroleum coke, fluid petroleum coke, metallurgical coke; other non-carbon pigments and additives which are useful include, without limitation, metals and metallic conductive and non-conductive materials such as zinc, aluminum, copper, nickel, ferrophosphorous, and the like.

The coke is blended or otherwise combined with a resin or matrix system as a binder. It will be appreciated that the selection of the binder is primarily dependant upon the end use of the conductive coating. For example, when selecting a binder for use in a composition to be employed as a cathodic protection material, it has been observed that it is important to select a binder which will adhere well to concrete, will be easy to apply, and which can be easily overcoated; it is also important that the binder-coke combination, when allowed to dry set up or cure, be water permeable. The final coating must breathe, i.e., it must permit moisture to pass through as temperature and relative humidity change. This prevents water from being trapped within the concrete and negating the effects of the cathodic protection and interfering with adhesion of the coating to the concrete.

Preferred resins for the binders or binder systems of the present invention include acrylics, acrylic emulsions, mixtures, and acrylic latexes including methacrylates, polyvinylacetate and polyvinylacetate acrylic polymers.

Particularly preferred are materials selected from the group consisting of methyl arylate, ethyl acrylate, methyl methacrylate, ethyl methacrylate, allyl methacrylate, n-butyl methacrylate, isobutyl methacrylate, and mixtures thereof. A typical material would include an acrylic emulsion, such as AC-64 manufactured by Rohm & Haas. Optionally, RM5, also manufactured by Rohm and Haas, may be employed as an acrylic thickener to modify viscosity.

Suitable conventional binder-compatible solvents and components may be employed in the coke-binder systems. For example, a suitable solvent, solvent blend or carrier solvent may be employed. The solvent may be, for example, an organic sovlent such as a conventional acrylic or methacrylic solvent system, including aromatic and aliphatic hydrocarbons, halogenated aromatic and aliphatic hydrocarbons, esters, ketones, and alcohols. Water may also be employed as a solvent, co-solvent, or as a solvent for one or more phases of an emulsion system.

Other common resin compatible components may also be employed at their art-established levels, including, without limitation, surfactants, emollients, wetting agents or other surface active agents, thickeners, buffers, neutralizing agents, chelating agents, anti-oxidants, curing agents, anti-microbials, anti-fungals, and the like.

In the wet (uncured) compositions of the present invention which are intended to be used as cathodic protectants, the resin polymer such as methyl acrylate, ethyl acrylate, methyl methacrylate or ethyl methacrylate is preferably employed at a level of from about 5 to about 50 percent, by weight of the wet composition. More preferably, the resin is employed at a level of about 10 to about 20 percent, and still more preferably at a level of about 10 to about 15 percent, by weight.

The coke (as expressly defined herein) is employed in the preferred cathodic protection compositions of the present invention at a level of about 0.5 percent to about 30 percent, by weight of the wet, uncured composition. More preferably, the coke is employed at a level of about 2 to about 25 percent, and still more preferably, at a level of about 5 to about 15 percent, by weight of the wet composition. In a highly preferred embodiment, the cathodic protection compositions of the instant invention employ a level of coke of about 5 percent to about 10 percent, by weight of the wet composition.

As noted above, the coke may be employed alone, or with other carbonaceous materials. When other elemental carbons are employed, such as carbon black, petroleum coke, calcined petroleum coke, fluid petroleum coke, metallurgical coke, and the like, the total elemental carbon in preferred compositions comprises about 5 percent to about 75 percent, by weight of the final wet composition. Of this total elemental carbon, about 5 percent to about 75 percent (of the total elemental carbon) is the unique ground coal-based calcined coke described herein. More preferaby, the total elemental carbon is present at a level of about 25 percent to about 60 percent, of which about 10 percent to about 25 percent is the coal-based calcined coke.

The highly preferred cathodic protection compositions of the present invention are substantially free of graphite, i.e., they employ less than about 10 percent, more preferably less than about 5 percent, and still more preferably less than about 1 percent graphite, by weight of the wet composition.

In a highly preferred embodiment, the cathodic protection compositions of the instant invention employ about 10 to about 25 percent deionized water, by weight; about 0.1 to about 10 percent of a thickener, such as hydroxyethyl cellulose and/or an acrylic thickener; about 0 percent to about 50 percent of a second carbon-based pigment or filler; about 0.01 percent to about 2.5 percent of a $C_3$–$C_{12}$ alcohol; and about 0.01 percent to about 2.5 percent of an antimicrobial-antifungal agent such as 2, 2-methylene-BIS-(4-chlorophenol).

In such preferred embodiments, a surfactant or emollient is also employed. Such surfactants are employed at a level of about 0.025 to about 5 percent, by weight of the wet composition, and more preferably at a level of about 0.05 to about 4 percent. In a highly preferred embodiment, the surfactant is employed at a level of about 1 percent to about 2 percent, by weight of the wet composition.

Any conventional compatible surfactant may be employed in the cathodic protection composition of the present invention. Preferred surfactants include TAMOL SN, a neutral sodium salt of a condensed aryl sulfonic acid sold by the Rohm & Haas Company.

The preferred compositions are preferably about 50 to about 80 percent total solids, and still more preferably about 70 to about 75 percent total solids, and preferaby possess a viscosity of about 3000 to about 4500 cps. Such a combination gives a final product which is easy to apply and which demonstrates excellent adhesion to concrete and the like.

The preferred compositions, when applied to a non-conductive surface at a rate which results in a coating thickness of ten mils after drying or curing, demonstrate a resistance of less than about 20 ohms per square unit, and even more preferably demonstrates a resistance in the range of about 10 to about 15 ohms per square unit, when a direct current is applied across a one inch distance and measured point to point.

By the term ohms/square or ohms per square, as used herein, is meant ohms per any practical square unit. That is, when a coating of a uniform thickness is examined, the resistance to a direct current from point A to point B, (t), is a function of the width, (w), of the square, the distance between the points, (d), the thickness of the coating, (t), and the nature of the conductive coating or material. The resistance varies directly with d and inversely with t and w. This can be expressed as $R=(K)(d)(t^{-1})(W^{-1})$. In all squares w=d; therefore, the above equation simplifies to become $R=k/t$. (Again, this is because w=d regardless of whether the square unit is an inch or a foot.)

The compositions of the present invention are preferably applied to concrete or other reinforced building materials in a fluid or gelatinous form and allowed to cure or dry in situ. The compositions can be applied in any conventional manner such as brushing, spraying, dipping, roller-coating, troweling and the like.

The compositions are applied at a rate such that the coating thickness, after drying/curing, is in the range of about 0.5 to about 50 mils; preferaby about 1 to about 30 mils; and more preferably about 2 to about 20 mils.

In a highly preferred embodiment, the cured protective coating and the ferrous-based low carbon steel reinforcement are contacted with a direct current power source such that the carbon-containing coating is anodic with respect to the reinforcement metal which is cathodic.

The resulting coated structure, which can be a roadway, bridge span, parking garage, dock or wharf, or any other sturcture which is exposed to brine, sea water or road salts and which is reinforced with a ferrous-based low carbon metallic element, will resist deterioration which results from the rusting or corrosion of the reinforcing element.

The compositions of the present invention may also be added to concrete, or other building materials, to provide static discharge protection and/or conductivity to the structural element fashioned from the concrete. This provides a structural element which can be heated and which can accept a durable overcoat for purposes of protection or decoration.

Such an addition also provides static discharge protection for areas which have concrete floors, walls, and the like. Such protection can be extremely important in work areas where static discharge can be extremely hazardous or harmful. Such environments would include, for example, surgical areas or other areas where explosive gases are employed. Other examples would include areas where computer chips are manufactured or the processing of information on magnetic storage devices occurs.

Such conductive concretes are prepared by first blending an aqueous pre-blend comprising elemental carbon, water, and other conventional additives described herein, such as a thickener, an anti-microbial antifungal, biocides, an alcohol, a surfactant, and the like. The pre-blend is then added to a conventional concrete pre-mix along with more elemental carbon and water.

It will be appreciated that preferably about 50 to about 95 percent of the elemental carbon, by weight, should be the ground calcined, coal-based cokes described herein.

In order to further illustrate the benefits and advantages of the present invention, the following examples are provided. It will be understood that the examples are provided for illustrative purposes and are not intended to be limiting of the scope of the invention as herein disclosed and as set forth in the claims.

All ingredients are added and admixed in a conventional manner unless otherwise indicated.

See also commonly assigned U.S. patent application Ser. No. 757,085, "Conductive Coatings for Elongated Conductors", Robert E. Wiley, and U.S. patent application Ser. No. 757,029, "Conductive Coatings and Foams for Anti-Static Protection, Energy Absorption, and Electromagnetic Compatability", Robert E. Wiley, both filed herewith; both expressly incorporated herein by reference.

EXAMPLE I

CATHODIC PROTECTION COATINGS

| Component | Source | Identity | A | B | C | D |
|---|---|---|---|---|---|---|
| Coke* | | Carbon | 9.32 | 8.93 | 7.68 | 7.42 |
| Carbon Black | | Carbon | 1.37 | 1.32 | 1.13 | 1.09 |
| Cellosize QP4H | Union Carbide | Hydroxyethyl Cellulose | 0.31 | 0.30 | 0.26 | 0.25 |
| Sindar G-4 | Givardon | 2,2 Methylene BIS (4-Chlorophenol) | 0.10 | 0.10 | 0.09 | 0.08 |
| Octyl Alcohol | Matheson | 1-Octanol | 0.07 | 0.07 | 0.06 | 0.06 |
| Tamol SN | Rohm and Haas | Neutral Sodium Salt of Condensed Aryl Sulfonic Acid | 0.17 | 0.16 | 0.14 | 0.14 |
| Deionized Water | | Deionized Water | 20.38 | 19.55 | 16.81 | 16.25 |
| | | | 31.72 | 30.43 | 26.17 | 25.29 |

The above items are charged into a pebble mill and run for about 24 hours to about an 8 Hegmann. The following are then added:

| AC-64 (60% NVM) | Rohm and Haas | Acrylic Emulsion | 15.86 | 15.22 | 13.08 | 12.64 |
|---|---|---|---|---|---|---|
| Coke #1 (conventional) | | Carbon | 23.80 | 27.17 | 23.36 | 22.57 |
| Coke #2 (conventional) | | Carbon | 23.80 | 27.18 | 23.36 | 22.47 |
| Ground Coke (conventional) | | Carbon | 4.82 | — | — | — |
| 999 | Troy Chem | Non-silicone Defoaming Surfactants | — | — | — | 0.10 |
| 5% Ammonia (23%) in DI Water | ACUS | Ammonia | — | — | 4.68 | 4.51 |
| 5% Natrosol MR in DI Water | Hercules | Hydroxyethyl Cellulose | — | — | 9.35 | 6.78 |
| 5% RM5 in DI | Rohm and Haas | Acrylic Thickener | — | — | — | 5.64 |
| | | | 100.00 | 100.00 | 100.00 | 100.00 |
| % Solids | | | 73–74 | 73–74 | 76–77 | 73–74 |
| Viscosity (Cps) | | | 3200 cps | 3100 cps | 3700 cps | 4200 cps |
| Resistance at 10 mils (Ω) (1 inch Point to Point) | | | 16–18 | 14–16 | 10–14 | 10–15 |
| Adhesion (On Concrete Block) | | | Excellent | Excellent | Excellent | Excellent |
| Pigment/Binder | | | 6.70/1 | 7.14/1 | 8.86/1 | 8.84/1 |

The above coatings A through D when applied to a concrete surface and air dryed, demonstate good adhesion to concrete, excellent water resistance, and good overcoatability. They have low resistance and are suitable for use in cathodic protection; they are substantially graphite free.

Substantially similar results are obtained when the conductive carbon black, and/or conventional cokes #1, #2, or the conventional ground coke is replaced, in whole or in part, with the coke* of the present invention.

*indicates that this material has an $E_c$ of about 29.

EXAMPLE II

CONCRETE ADDITIVE

| Ingredient | Source | Identity |
|---|---|---|
| Base No. 1 | | |
| 29.34 Coke* | | |
| 4.32 Carbon Black Pellets | | Carbon |

EXAMPLE II-continued

CONCRETE ADDITIVE

| Ingredient | Source | Identity |
|---|---|---|
| 0.99 Cellosize QP40H | Union Carbide | Hydroxyethyl Cellulose |
| 0.33 Sindar G-4 | Givardon | 2,2 Methylene BIS (4-Chlorophenol) |
| 0.22 Octyl Alcohol | Matheson | 1-Octanol |
| 0.54 Tamol SN | Rohm and Haas | Neutral Sodium Salt of Condensed Aryl Sulfonic Acid |
| 64.26 Deionized Water | ACUS | |
| 100.00 | | |

The above ingredients are ground for about 24 hours in a Pebble mill.
% Solids       35.5
Hegmann        8+
pH             8+
Viscosity      600–700 cps (Brookfield)

Base No. 2

| 23.25 Coke* | | Carbon |
|---|---|---|
| 4.65 Carbon Black Pellets | | Carbon |
| 0.93 Cellosize QP40H | Union Carbide | Hydroxyethyl Cellulose |
| 0.32 Sindar G-4 | Givardon | 2,2 Methylene BIS (4-Chlorophenol) |
| 0.22 Octyl Alcohol | Matheson | 1-Octanol |
| 0.84 Tamol SN | Rohm and Haas | Neutral Sodium Salt of Condensed Aryl Sulfonic Acid |
| 69.79 Deionized Water | ACUS | |
| 100.00 | | |

The above ingredients are ground in a Pebble mill for 40 hours to an 8 Hegmann.
% Solids        30–32%
Weight/Gallon   9.83 lbs.
pH              8+
Viscosity       100–200 cps (Brookfield)
Hegmann         8

Suitable compositions within the scope of the present invention would be as follows:

| Range | Ingredients |
|---|---|
| 10–50 | parts Base 1 or Base 2 |
| 20–10 | parts Elemental Carbon |
| 20–10 | parts Coke |
| 50–30 | parts Preblended concrete mix and water as needed |
| 100 100 | |

When the use of either of the above dispersions using coke* conjointly employ conventional coarse coke or carbon, they will react synergistically to produce lower resistances than normally attainable with just the coarse carbon. This will allow for denser, stronger concrete structures.

However, substantially similar results are obtained if all of the remaining carbonaceous material were replaced, in whole or in part, with coke*.

*indicates that this material has an $E_c$ value of about 29.

What is claimed is:

1. A conductive coating composition useful in the protection of concrete or other construction material reinforced with a ferrous-based low carbon steel element comprising:
   (a) about 5 percent to about 75 percent total elemental carbon, by weight of the composition;
   (b) about 5 percent to about 50 percent of a polymeric binder, by weight of the composition;
   (c) about 5 percent to about 50 percent of a solvent, by weight of the composition; and
   (d) about 0 percent to about 5 percent of a surfactant, by weight of the composition;
wherein about 5 percent to about 75 percent of said total elemental carbon, by weight of the elemental carbon, is a ground coal-based, calcined coke, said coke demonstrating an $E_c$ value of about 27 to about 80; and further wherein said polymeric binder, when cured, is moisture permeable.

2. A composition according to claim 1 wherein the fuel composition is substantially graphite free.

3. A composition according to claim 1 wherein the elemental carbon is present at a level of about 25 percent to about 60 percent, by weight of the composition.

4. A composition according to claim 3 wherein the elemental carbon is present at a level of about 45 percent to about 60 percent, by weight of the composition.

5. A composition according to claim 4 wherein about 10 percent to about 25 percent of the elemental carbon, by weight of the elemental carbon, is the coal-based, calcined coke.

6. A composition according to claim 1 wherein the surfactant is present at a level of about 1 percent to about 2 percent, by weight of the composition.

7. A composition according to claim 6 wherein the polymeric binder is selected from the group consisting of acrylic and acrylic latex polymers.

8. A composition according to claim 7 wherein the polymeric binder is selected from the group consisting of acrylic and acrylic acid, methyl acrylate, ethyl acrylate, methyl methacrylate, ethyl methacrylate, and mixtures thereof.

9. A composition according to claim 1 wherein the solvent is a blend that includes water.

10. A composition according to claim 8 wherein the binder is an acrylic emulsion.

11. A composition according to claim 9 which additionally comprises:
   (a) about 0.1 percent to about 10 percent of a thickener;
   (b) about 0.01 percent to about 25 percent of a $C_3$–$C_{12}$ fatty alcohol; and
   (c) about 0.01 percent to about 2.5 percent of a compound selected from the group consisting of antimicrobials, antifungals, and mixtures thereof.

12. A composition according to claim 11 wherein said coal-based, calcined coke has an $E_c$ value of about 28 to about 75.

13. A composition according to claim 12 wherein said coal-based, calcined coke has an $E_c$ value of about 28 to about 65.

14. A conductive coating composition useful in the protection of concrete or other construction material reinforced with a ferrous-based low carbon steel element comprising:
   (a) about 5 percent to about 75 percent total elemental carbon, by weight of the composition;
   (b) about 5 percent to about 50 percent of a polymeric binder, by weight of the composition;
   (c) about 5 percent to about 50 percent of a solvent, by weight of the composition; and
   (d) about 0 percent to about 5 percent of a surfactant, by weight of the composition;
wherein substantially all of the elemental carbon is a ground coal-based, calcined coke, said coke demonstrating an $E_c$ value of about 27 to about 80; and further wherein said polymeric binder, when cured, is moisture permeable.

15. A composition according to claim 1 wherein the $E_c$ value is measured for the 002 peak when subjected to x-ray powder diffraction employing Mo K$\alpha$ radiation with an average wavelength of 0.71Å.

16. A composition according to claim 14 wherein the $E_c$ value is measured for the 002 peak when subjected to x-ray powder diffraction employing Mo K$\alpha$ radiation with an average wavelength of 0.71Å.

* * * * *

UNITED STATES PATENT AND TRADEMARK OFFICE
CERTIFICATE OF CORRECTION

PATENT NO. : 4,806,272

DATED : February 21, 1989

INVENTOR(S) : Robert E. Wiley

It is certified that error appears in the above-identified patent and that said Letters Patent is hereby corrected as shown below:

Column 1, line 39,
"anually" should be --annually--.

Column 5, line 54,
"2" should be --28--.

Column 6, line 29,
"of" should be --and--.

Column 6, line 63,
"arylate" should be --acrylate--.

Column 7, line 7,
"sovlent" should be --solvent--.

Column 8, lines 18 and 19,
"preferaby" should be --preferably--.

UNITED STATES PATENT AND TRADEMARK OFFICE
CERTIFICATE OF CORRECTION

PATENT NO. : 4,806,272

DATED : February 21, 1989

INVENTOR(S) : Robert E. Wiley

It is certified that error appears in the above-identified patent and that said Letters Patent is hereby corrected as shown below:

Column 8, line 27,
"demonstrates" should be --demonstrate--.

Column 8, line 62,
"sturcture" should be --structure--.

Columns 9 and 10, line 21,
insert "Haas" in column labeled "Source".

Column 12, line 5, Claim 2,
"fuel" should be --final--.

Signed and Sealed this

Third Day of April, 1990

Attest:

HARRY F. MANBECK, JR.

*Attesting Officer*      *Commissioner of Patents and Trademarks*